United States Patent
Seliga

(10) Patent No.: US 9,661,802 B1
(45) Date of Patent: May 30, 2017

(54) SULKY WITH FENDER DOOR FOR CLEANING

(71) Applicant: James Seliga, Bellevue, OH (US)

(72) Inventor: James Seliga, Bellevue, OH (US)

( * ) Notice: Subject to any disclaimer, the term of this patent is extended or adjusted under 35 U.S.C. 154(b) by 0 days.

(21) Appl. No.: 15/005,868

(22) Filed: Jan. 25, 2016

Related U.S. Application Data

(60) Provisional application No. 62/108,345, filed on Jan. 27, 2015.

(51) Int. Cl.
  *B62D 51/02* (2006.01)
  *A01D 34/00* (2006.01)
  *A01D 101/00* (2006.01)

(52) U.S. Cl.
  CPC ......... *A01D 34/003* (2013.01); *A01D 34/001* (2013.01); *A01D 2101/00* (2013.01)

(58) Field of Classification Search
  CPC .... A01D 34/003; A01D 34/001; A01D 34/00; B62D 51/02
  See application file for complete search history.

(56) References Cited

U.S. PATENT DOCUMENTS

| | | | |
|---|---|---|---|
| 6,375,201 B2 * | 4/2002 | Havener | B60D 1/00 280/32.7 |
| 6,692,010 B1 * | 2/2004 | Johnson | A01D 34/001 280/32.7 |
| 7,059,615 B2 * | 6/2006 | Johnson | A01D 34/001 280/32.7 |
| 7,364,169 B2 * | 4/2008 | Velke | A01D 34/82 280/32.7 |
| 7,527,285 B2 * | 5/2009 | Vachal | B62D 51/008 280/32.7 |
| 9,167,748 B1 * | 10/2015 | Houston | A01D 34/001 |

* cited by examiner

*Primary Examiner* — Brian Swenson
(74) *Attorney, Agent, or Firm* — Jerry Semer

(57) ABSTRACT

The article of manufacture is a sulky with a unique fender. The fender has an opening with a door place over the tire. On one end of the opening is a hinge that is attached to one end of door. At the other end of the door and opening is a latching assembly. This enable the door to be closed and latched during mowing and to be easily opened when the operator wishes to clean the debris that has collected between the tire and the fender. The latching assembly is an over center draw latch consists of a hook attached to a pivotally mounted lever. The pivotally mounted lever is attached to the fender. On the door is an opening into which the hook is designed to fit. When debris builds between the fender and the tire the operator stops the sulky and opens the door for cleaning.

5 Claims, 4 Drawing Sheets

SULKY WITH FENDER DOOR FOR CLEANING

FIELD OF INVENTION

The present invention relates to the field of sulkies for use with a self-propelled, walk-behind power lawn mower and, more particularly a sulky with a fender with a door for easier cleaning.

BACKGROUND OF THE INVENTION

Walk-behind power machines such as wide-area lawn mowers have been in use for years. These mowers generally include a frame having an engine that power drives the wheels as well as a cutting deck. Rearwardly extending handlebars are typically provided to permit operator control of the mower. By selectively manipulating controls on the handle bars, the operator can control the direction and speed of the mower. These walk-behind mowers provide potential advantages over conventional riding mowers including, for example, simpler operation, lower operating cost, higher maneuverability, and smaller size.

While effective, operation of walk-behind mowers may, in certain circumstances, result in premature operator fatigue due to the need to continually walk behind the mower at what is often considered a brisk pace. In the commercial landscape and lawn care business, it is not uncommon to operate these mowers in excess of eight hours per day.

To alleviate operator fatigue, sulkies may be used. An example sulkies is disclosed in U.S. Pat. No. 5,004,251 (to Velke). Sulkies are typically configured as a trailered apparatus which connects to a frame of the lawn mower. The operator may then ride on a platform of the sulky, thereby eliminating the need to constantly walk during operation.

One problem with sulkies is that operation of sulkies results in excessive mud and debris collection between the fender and the tire. This debris may eventually interfere with tire's rotation (e.g., locking of the tire), which may result in turf damage, problem with control and even accidents injuring the rider.

For sulkies in the prior art to correct this problem the wheel and tire must be removed and the fender and the tire must be cleaned. To remove the wheel is very time consuming and it takes tools. Thus a rider of the sulky must stop his mowing and get tool and remove and clean the wheel and tire out in the field. The objective of this invention is to eliminate the problem of removing the wheel and shorten the time to clean the tire and fender substantiality.

The inventor is able to obtain this goal by placing a hinged door on the top of the fender and a latching system to keep the door closed. The door can be easily unlatched and open and the area between the tire and the fender can be easily cleaned. The door takes up a large portion of the top of the fender to give the rider plenty of room to completely clean the tire.

SUMMARY OF THE INVENTION

The article of manufacture is a sulky with a unique fender. The fender has a door place over the tire. The fender has a large opening over the tire. On one end of the opening is a hinge that is attached to one end of door. At the other end of the door and opening is a latching assembly. This enable the door to be closed and latched during mowing and to be easily opened when the operator wishes to clean the debris that has collected between the tire and the fender. In the preferred embodiment the latching system is an over center draw latch. The over center draw latch consists of a hook attached to a pivotally mounted lever. The pivotally mounted lever is attached to a base plate on the fender. On the door is a keeper or opening into which the hook is designed to fit.

To latch the door to the fender the door is closed over the opening in the fender and the hook is placed in the opening or keeper in the door. The pivotally mounted lever is pivoted and snaps into lock position which places tension on the hook within the keeper holding the door against the fender. To open the door the pivotally mounted lever is pivot in the opposite direction and the tension of the hook on the keeper is released enabling the hook to be removed from the keeper and the door to be opened.

The sulky is attach to the mower and used as any sulky in the prior art. When debris builds between the fender of the sulky and the sulky's tire the operator stops the sulky and pivots the lever of the center draw latch and remove the hook from the keeper and opens the door on the sulky's fender. The operator can now easily remove the debris between the tire and the fender.

DETAIL DESCRIPTION OF THE INVENTION

Figure 1:
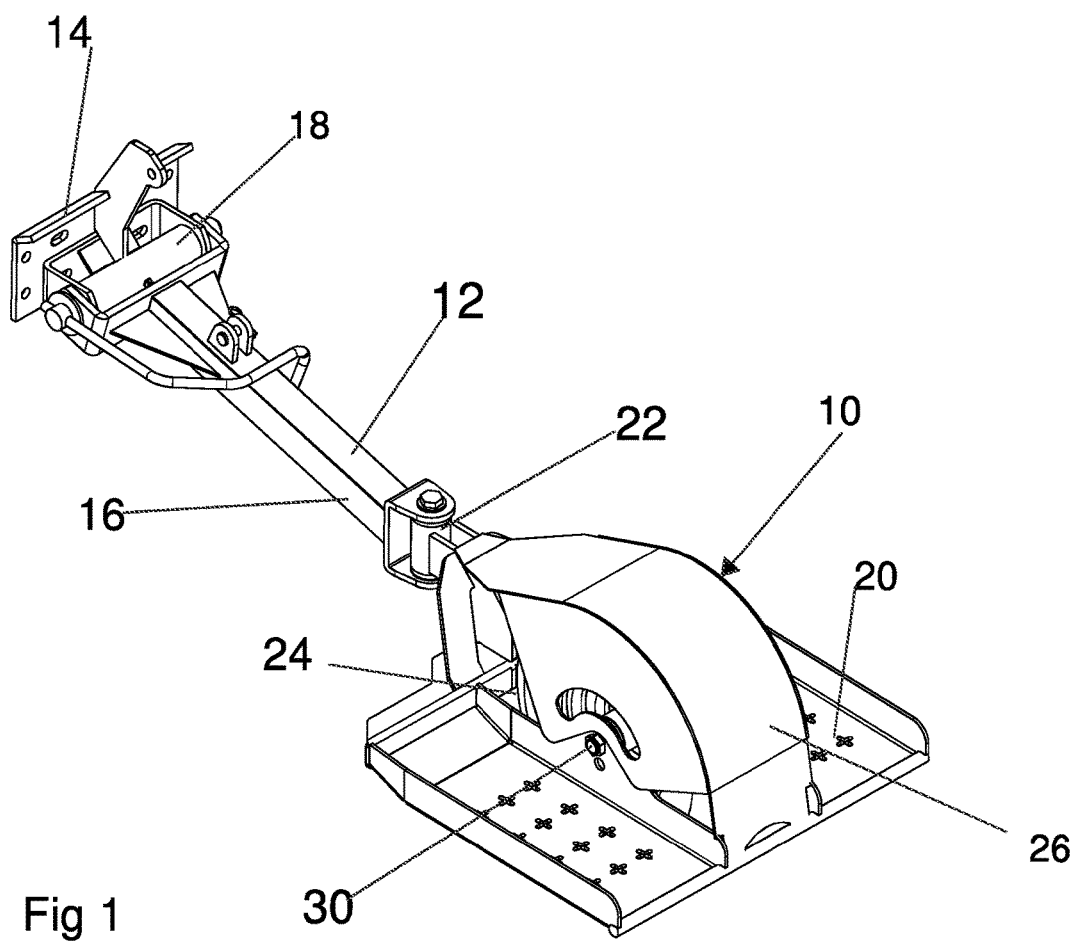
FIG. 1 is a perspective drawing of a one wheeled sulky.

FIG. 1 shows the prior art of a normal one wheeled sulky 10. The sulky 10 is comprised of a means for attaching to the mower 12. The means for attaching to the mower 12 includes an attaching plate 14 that bolts the sulky 10 to the mower. Attached to the attaching plate 14 is an arm 16. Arm 16 is attach to the attaching plate 14 by a vertically rotatable coupling 18. Arm 16 is attach to the sulky platform 20 by a horizontally rotatable coupling 22. The sulky platform 20 contains a wheel 24 for rolling on the ground. The wheel 24 is covered by a fender 26. The wheel 24 is attached to sulky platform 20 for the operator's feet by an axle 31.

The sulky 10 is attached to a self-propelled mower. The sulky 10 enables the operator to ride behind the self-propelled mower rather than walk which lessens operator fatigue. The sulkies 10 attached to self-propelled mowers which are heavily used in the commercial mowing business.

One problem with sulkies 10 is that operation of sulkies 10 results in excessive mud and debris collection between the fender 26 and the wheel 24 or tires. This debris may eventually interfere with wheel's 24 rotation (e.g., locking of the tire), which may result in turf damage, problem with control and even accidents injuring the rider.

Figure 2:
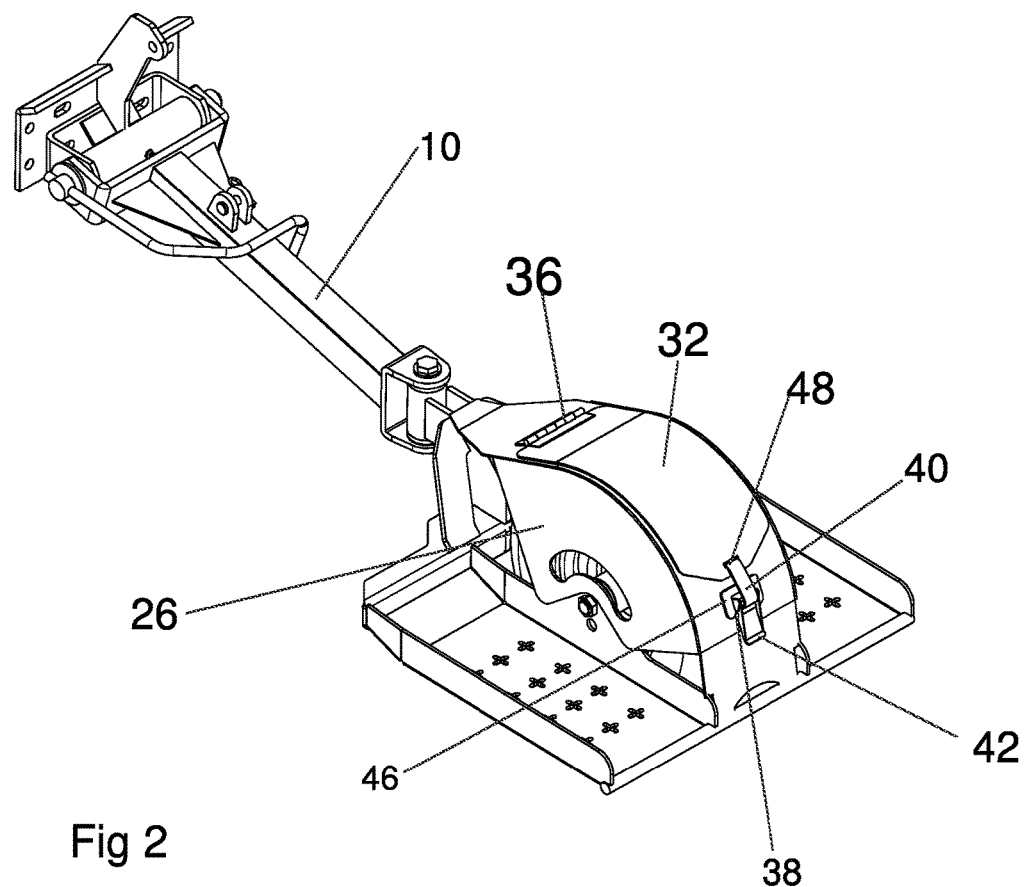
FIG. 2 is a perspective drawing of a one wheeled sulky with the invention, a door on the fender with the door closed.
Figure 3:
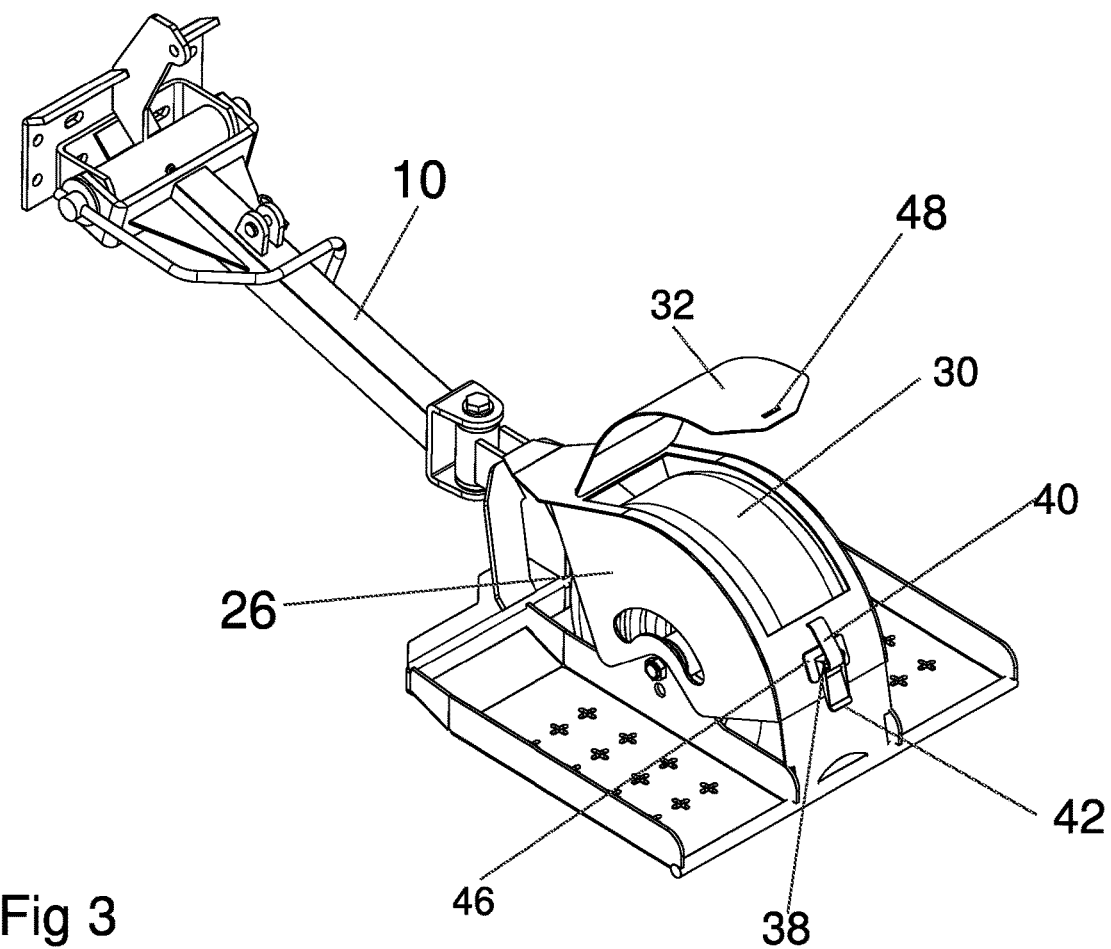
FIG. 3 is a perspective drawing of a one wheeled sulky with the invention, a door on the fender with the door open.

To solve this problem applicant has placed an opening 30 in the top of the fender 26 that is covered by a door 32 as shown in FIGS. 2 and 3. FIG. 2 shows the sulky 10 with the door 32 closed. FIG. 2 shows the door 32 on fender 26. Door 32 takes up a large area of fender 26. This enable door 32 to cover a large opening 30 in fender 26 shown in FIG. 3. The large opening 30 allow the operator to easily clean the area between the fender 26 and the wheel 24. The door 32 is attached to fender 26 by a hinge 36. Hinge 36 allows door 32 to be open and expose the large opening 30 as shown in FIG. 3. The door 32 in FIG. 2 is shown in locked position. At the end of door 32 opposite the hinge 36 is the latching assembly 38.

There are many forms of latching assemblies. In the preferred embodiment the latching assembly 38 is an over center door latch. However there are many latching assemblies that can be used that are known in the prior art such as slam latch, cam lock, bar latch, spring latch, etc. The latching assembly 38 (over center door latch) consists of a hook 40 attached to a pivotally mounted lever 42. The pivotally mounted lever 42 is attached to a base plate 46 on the fender 26. On the door 32 is a keeper or opening 48 best shown in FIG. 3 into which the hook 40 is designed to fit. To latch the door 32 to the fender 26 the door 32 is closed over the opening 30 in the fender 26 and the hook 40 is placed in the opening 48 or keeper in the door 32. The pivotally mounted lever 42 is pivoted and snaps into lock position which places tension on the hook 40 within the opening 48 in the door 32 holding the door 32 against the fender 26. The door 32 in closed and latched position is shown in FIG. 2.

To unlatch and open the door 32 the pivotally mounted lever 42 is rotated in the opposite direction and the tension of the hook 40 on the opening 48 in the door 32 is released enabling the hook 40 to be removed from the opening 48 in the door 32 and the door 32 to be opened. The door 32 in open and unlatch position is shown in FIG. 3.

Figure 4:
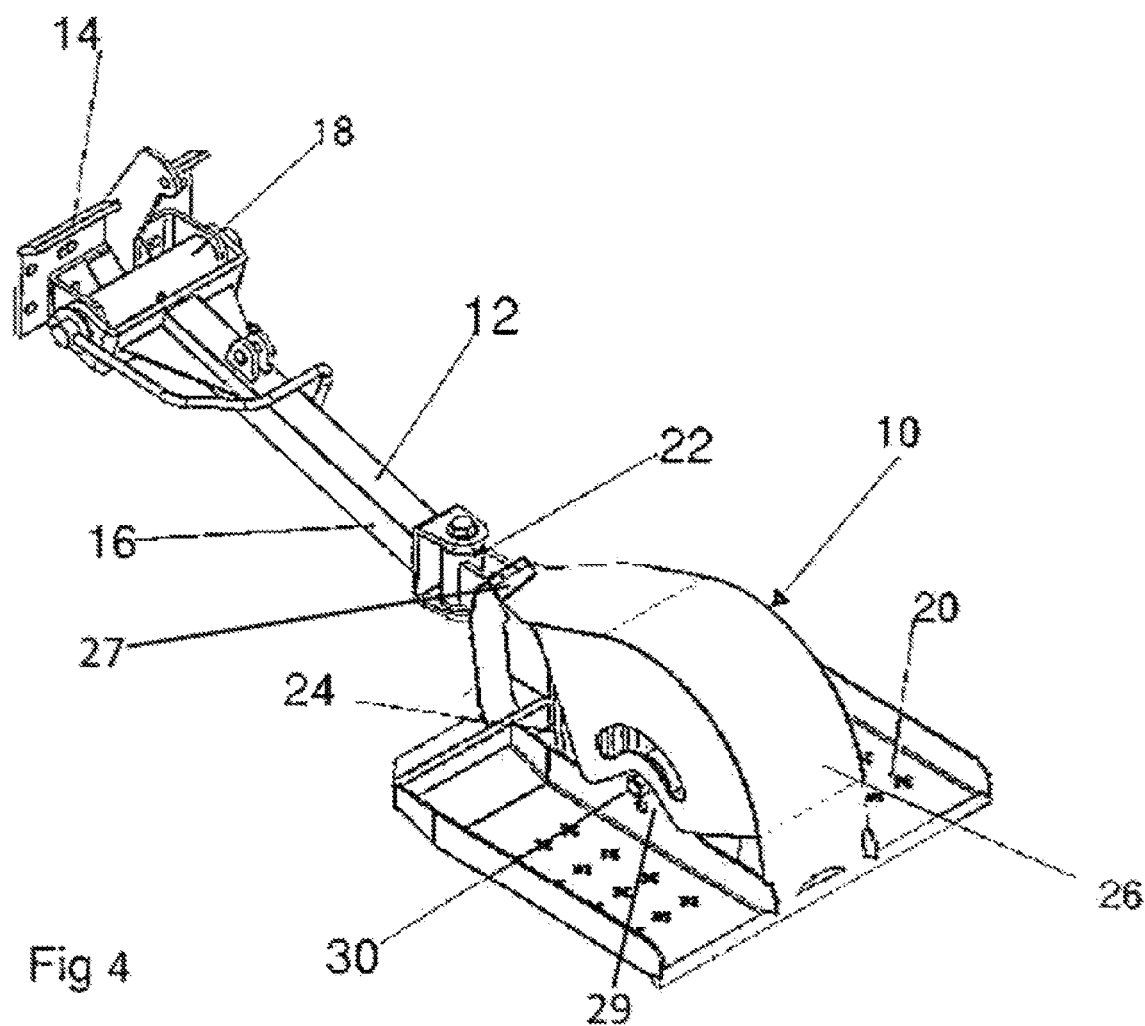
FIG. 4 is a perspective drawing of a one wheeled sulky with another embodiment of the invention where the whole fender can be removed.

Another embodiment of the invention is shown in FIG. 4. In this embodiment the whole fender 26 can be removed. In this embodiment the fender 26 is held to the sulky by the friction of the fender's sides 29 against the sulky platform inter sides 21. The fender 26 can be completely lift off or just swung out of place as shown in FIG. 4. The fender 26 is attached to the sulky by a hinge 27. To use this embodiment when debris builds between the fender 26 and the wheel 24 the operator stops the sulky and lifts the fender 26 and cleans out the debris.

I claim:

1. A sulky fender that cover a sulky's wheel comprising:
   a. a curved piece of material that covers the sulky's wheel; and,
   b. an opening in the curved piece of material over the sulky's wheel; and,
   c. a door that covers the opening; and,
   d. a hinge that attaches the door to the curved piece of material; and,
   e. wherein an individual can open the door and clean debris that has collected between the curved piece of material and the sulky's wheel.

2. The sulky fender that covers a sulky's wheel as in claim 1 comprising:
   a. a latching system that latches the curved piece of material and the door when the door is closed over the opening in the curved piece of material.

3. The sulky fender that covers a sulky's wheel as in claim 2 comprising;
   a. the latching system comprises;
      (1) a hook attached to the curved piece of material; and,
      (2) an opening on the door into which the hook is designed to fit; and,
      (3) wherein when the door is latched the hook is placed through the opening on the door which places tension on the hook within the opening in the door holding the door against the curved piece of material.

4. The sulky fender that covers a sulky's wheel as in claim 2 comprising;
   a. the latching system comprises;
      (1) a pivotally mounted lever attached to the curved piece of material; and,
      (2) a hook attached to the pivotally mounted lever; and,
      (3) an opening on the door into which the hook is designed to fit; and,
      (4) wherein when the door is latched the hook attached to the pivotally mounted lever is placed through the opening on the door and the pivotally mounted lever is pivoted and snaps into lock position which places tension on the hook within the opening in the door holding the door against the curved piece of material.

5. The sulky fender that covers a sulky's wheel a tire as in claim 2 comprising;
   a. the latching system is an over center door latch.

* * * * *